(12) United States Patent
Isaacs (10) Patent No.: US 7,256,702 B2
(45) Date of Patent: Aug. 14, 2007

(54) GAS SUPPLY PRESSURE ALARM DEVICE

(75) Inventor: Michael S. Isaacs, 175 Falmouth St., Brooklyn, NY (US) 11235

(73) Assignee: Michael S. Isaacs, Brooklyn, NY (US)

( * ) Notice: Subject to any disclaimer, the term of this patent is extended or adjusted under 35 U.S.C. 154(b) by 464 days.

(21) Appl. No.: 10/920,939

(22) Filed: Aug. 18, 2004

(65) Prior Publication Data

US 2006/0038695 A1   Feb. 23, 2006

(51) Int. Cl.
    *G08B 21/00*    (2006.01)
(52) U.S. Cl. .................. 340/686.1; 340/686; 340/438; 340/445; 73/168; 200/61.25
(58) Field of Classification Search ................ 340/688, 340/686.1, 626, 438, 442, 445, 632, 603; 73/146.3, 168; 128/204.18; 200/61.22, 200/61.25
    See application file for complete search history.

(56) References Cited

U.S. PATENT DOCUMENTS

| | | | | |
|---|---|---|---|---|
| 3,862,386 | A * | 1/1975 | Hall ..................... | 200/61.45 R |
| 3,930,223 | A * | 12/1975 | Tsagas ........................ | 340/442 |
| 4,275,393 | A * | 6/1981 | Johnston .................... | 340/688 |
| 4,783,772 | A * | 11/1988 | Umemoto et al. ............ | 368/11 |
| 5,054,653 | A * | 10/1991 | McNab ........................ | 222/28 |
| 5,357,242 | A * | 10/1994 | Morgano et al. ............ | 340/626 |
| 6,067,022 | A * | 5/2000 | Laswick et al. ............ | 340/626 |
| 6,209,579 | B1 * | 4/2001 | Bowden et al. ............. | 137/557 |
| 6,452,510 | B1 * | 9/2002 | Zysko ........................ | 340/970 |
| 6,656,154 | B1 * | 12/2003 | Addis .................... | 604/100.01 |

OTHER PUBLICATIONS

Clear-View Pressure Switch, McMaster-Carr Catalogue 2003, p. 510.
Differential Pressure Switches with Dial Gauge, McMaster-Carr Catalogue 2003, p. 511.
Improvements Cataloge, Hanover, PA, 17333-0084, May 2003, p. 68, "179626 LP-Tank Safety Gauge".
Smith (Arcsmith Company) Advertizement for Smith Equipment Replacement Pressure Gauge having a warning display range, page unknown, located from company.

* cited by examiner

Primary Examiner—Benjamin C. Lee
Assistant Examiner—Daniel Previl
(74) Attorney, Agent, or Firm—Lackenbach Siegel, LLP; Myron Greenspan (57) ABSTRACT

The present invention provides a pressure alarm for use in conjunction with conventional pressure gauge unit systems, as a replacement pressure gauge and alarm, or as a pressure alarm system. The invention provides adaptable alarm feedback signals for an operator, preventing the unexpected loss of pressure when using a gas cylinder, pressure boiler, or other device. The invention provides an alarm that may be a visual, audible, electronic, or mechanical low-pressure alarm and may include a means of ordering replacement supplies or sending a warning message. A system controller and memory module prevents false alarms and eases the burden of the operator while allowing external input and control.

17 Claims, 7 Drawing Sheets

GAS SUPPLY PRESSURE ALARM DEVICE

BACKGROUND OF THE INVENTION

1. Field of the Invention

The present invention relates to a pressure alarm device. More specifically, the present invention relates to a pressure alarm device operable with, or incorporated into, a pressure gauge incorporated into a pressure regulator for a gas cylinder.

2. Description of the Related Art

Balloons and inflatable advertising displays are often filled with conventional gas cylinder units. Most frequently, this type of conventional gas cylinder unit includes a gas cylinder containing Helium (He), but other conventional non-combustible gasses (Nitrogen and Argon) are also used.

In some circumstances, conventional gas cylinder units also include a control mechanism, frequently placed on the top of the gas cylinder for user convenience. Conventional gas cylinder control mechanisms are threaded into the top of the gas cylinder and are often actuated by a control valve of conventional design. Conventional control mechanisms include a pressure control valve (usually a ball or a needle valve), a combination pressure regulator and gauge, and at least one male filling adapter that mates with a balloon or display opening during filling to provide a gas tight seal. Frequently, multiple male extensions are used to allow ready adaptation with a variety of balloon types.

Conventionally combined pressure regulator and gauge sets include a conventional regulator with a visual gauge and a safety pressure relief device or over-pressure vent opening. Conventional visual gauges have a body enclosing a face and an indicator needle. The needle is registered against a scale printed on the face of the gauge. The needle is most frequently connected to a conventional Bourdon-tube type gauge movement and directly reflects an existing gas cylinder pressure when the conventional regulator is open. Using this type of combined regulator/gauge set, operators may both regulate the available pressure (by opening and closing the regulator) and monitor the existing gas cylinder pressure by viewing the visual gauge.

In an alternative conventional circumstance, a pressure regulator gauge is connected to a propane (LP) cylinder of the type normally associated with a back-yard gas grill. A control valve, in a direct line with the gauge, opens the LP cylinder providing propane access to the grill via a braided hose and a set of quick-disconnect fittings. In use, an operator connects the braided hose to a coupling down stream from the pressure regulator gauge. As the operator opens the valve, the gauge reads the tank pressure. As the LP gas is used, the gauge generally reflects the remaining pressure in the tank and hence the remaining volume of LP gas.

In either conventional circumstance, certain design and safety standards may govern the type of connections and fittings which are used. Particularly of note are the design and safety standards governing conventional pressure regulator gauges are prepared by the Compressed Gas Association (CGA) and other governmental bodies to protect the public.

Unfortunately, end users for either type of conventional gas cylinder unit (LP, He, N, etc.) are often untrained and unsophisticated in monitoring the visual gauges and scheduling appropriate replacement gas cylinder delivery. Additionally, the balloon/entertainment and advertisement industries often cannot afford to competently train end users and may experience sudden workflow changes making reliable and regular cylinder replacement scheduling difficult. Over ordering of replacement gas cylinders increases inventory costs. Under ordering of replacement gas cylinder results in sudden operational shut down and client loss. Finally, conventional indicator needle-type combination pressure regulator gauges often include small and inaccurate scales and are often difficult to read from any distance.

Attempts to make conventional visual gauges more useful include labeling the gauge face, adjacent a zero (0) pressure value, a warning color or other indicia of low pressure. One conventional gauge-less regulator (without a needle-type gauge) includes a spring-loaded "pop-up" indicator providing a visual indicator of low pressure. Unfortunately, these conventional low-pressure warning systems are small, are hard to read, are easily hidden by dirt, or require experience or training to read. Unfortunately, there is no conventionally available and adaptable alarm system for conventional types of gas cylinder units that would overcome these problems and provide easy end user with a simple and cheap warning prior to emptying the gas cylinder.

While complex conventional pressure sensing and alarm system exist, these systems require custom design and are often regulated by external and large computerized feedback and pressure-check loops, the high cost and maintenance fees associated with acquisition and operation of these systems is prohibitive to the home grilling, balloon, and advertising display industry. Additionally, these large conventional pressure sensing and alarm systems often require lengthy hard-wire connections with separate computer modules and a full time power supply to function reliably.

In summary, the problems of commercially available combination pressure regulator gauges include:

1. Lack of positive audible, visible, or vibratory alarm signal to warn unskilled end users of low-pressure level.
2. High purchase, installation, and maintenance costs for conventionally available systems.
3. Poor gauge face resolution making accurate gauge reading difficult by unsophisticated end users.
4. Lack of adaptable pressure alarms that can be applied to existing conventional pressure regulator gauges in the field without complex or hard-wire support systems for power supplies and sensor operation.
5. Low portability and difficulty in repositioning on replacement modules.
6. Lack of easy communication and/or control between a gauge and an off-site monitor, controller, owner.

SELECTED OBJECTS AND SUMMARY OF THE INVENTION

An object of the present invention is to provide an invention that overcomes the detriments of conventional alarm devices discussed above.

Another object of the present invention is to provide a pressure alarm device and an adaptable alarm system that allows easy adaptation to conventional pressure gauges or easy replacement of conventional pressure gauges.

It is another object of the present invention to provide a pressure alarm that is readily adaptable to a variety of difficult operational environments and conditions.

It is another object of the present invention to provide a pressure alarm device with multiple types of low pressure alarms.

Another object of the present invention is to provide a pressure alarm system that is easily used by unsophisticated end users and is inexpensive or generally costless to operate.

Another object of the present invention is to provide a pressure alarm device, wherein a pressure gauge and an alarm device are combined and conveniently adaptable to conventional pressure systems.

Another object of the present invention is to provide a pressure alarm and pressure control system, wherein a pressure control system includes an alarm device.

Another object of the present invention is to provide a pressure alarm and pressure control system linked to and operable with a communication interface for sending pressure alarm, control, and other operational data and for receiving controlling informational pressure alarm data from an external control source.

Another object of the present invention is to provide a pressure alarm and pressure alarm control system linkable with a communication interface for sending pressure alarm data and for receiving controlling or inquiry pressure alarm data from an external source via wireless signals, between at least one of the pressure alarm body and communication interface and an external control source.

Another object of the present invention is to provide a pressure alarm device, having a system controller adapted to monitor a tank pressure and upon reaching a programmable and up-datable pressure low-point, provides and generates at least one of a low pressure alarm and a re-supply order or email alarm message via the world-wide net.

The present invention relates to a pressure alarm device for use either in conjunction with conventional pressure gauge unit systems or as a replacement pressure gauge. The invention provides multiple types of adaptable and programmable alarm feedback for an operator that prevents unexpected loss of pressure when using a gas cylinder. The invention provides at least one of a visual, audible, or mechanical low-pressure alarm either directly or via the world wide web, cellular telecommunication systems, or paging communication systems. A system controller and memory module prevents false alarms and ease operator burdens while providing programmable operator instructions.

According to one embodiment of the present invention, there is provided, a pressure alarm device, for a pressure gauge having an indicator needle operable about a pivot, the pressure alarm device comprising: an alarm body, at least a first means for sensing at least a first desired position of the needle relative to the pivot during a use of the pressure gauge and for creating a corresponding position signal, the means for sensing and creating operably joined to the alarm body, means for retaining the alarm body proximate the pressure gauge and for positioning the means for sensing relative to the first desired position, alarm circuit means for receiving the position signal and for generating at least one alarm signal, the means for receiving and generating operably joined to the alarm body, and means for supplying power to the alarm circuit means, whereby during the use when the means for sensing and creating determines the needle is at the at least first desired position and creates the corresponding position signal, the alarm circuit means receives the position signal and generates the at least one alarm signal.

According to another embodiment of the present invention, there is provided a pressure alarm device, further comprising: at least one alarm generating component in the alarm circuit means, the at least one alarm component generating the at least one alarm signal, the at least one alarm component being at least one of an audible alarm unit, a visual alarm unit, an wired electronic message alarm unit, a wireless electronic message alarm unit, and a mechanical alarm unit, and the at least one alarm signal being at least one of an audible signal, a visual signal, an electronic signal, an electronic message signal, and a mechanical signal, whereby the one at least one alarm component is effective to notify a user of the alarm signal.

According to another embodiment of the present invention, there is provided a pressure alarm device, wherein: the means for retaining and positioning the alarm body proximate the pressure gauge includes at least one of an elastomeric member system, a cover system, and an adhesive system.

According to another embodiment of the present invention, there is provided a pressure alarm device, wherein: the elastomeric member system includes an elongated elastic member, the elastic member elastically retaining and repositionably holding the alarm body relative to an outer circumference of the pressure gauge, the elastic member enabling the user to position and retain the alarm body along the outer circumference relative to the first desired position, and the elastic member urging the alarm body into a stabilizing close contact with the outer circumference during the use, whereby the means for sensing reliably senses the needle relative to the first desired position during the use.

According to another embodiment of the present invention, there is provided a pressure alarm device, further comprising: a pair of support arms extending outward from the alarm body, the support arms including at least concave contact surfaces, and the elastic member urging the concave contact surfaces into a mating contact with a selected convex portion of the outer circumference during the use, whereby the support arms align the alarm body with the pressure gauge during the use and guide the alarm body about the outer circumference during a repositioning.

According to another embodiment of the present invention, there is provided a pressure alarm device, wherein: the cover system includes at least a cover front and a cover back, the means for sensing and for creating the position signal in the cover front, the cover front covering at least a portion of a face of the pressure gauge, the cover back covering at least a portion of a back of the pressure gauge, and means for connecting and positioning the cover front relative to the cover back and enabling an alignment of the means for sensing and creating relative to the at least first desired position, whereby the cover system enables ready adaptation of the pressure alarm device to preexisting the pressure gauge.

According to another embodiment of the present invention, there is provided a pressure alarm device, further comprising: a sliding snap lock connection in the means for connecting and positioning, the sliding snap lock connection including a sliding-snap male member and a sliding-snap female member on respective the cover front and the cover back, and the sliding-snap male member and the sliding-snap female member enabling positive engagement between the cover front and the cover back while permitting rotation of the cover front relative to the pressure gauge, whereby the user may reposition the means for sensing relative to the needle during the use.

According to another embodiment of the present invention, there is provided a pressure alarm device, wherein: the pressure alarm device includes the adhesive system fixably joining the alarm body to the pressure gauge after a positioning of the means for sensing relative to the at least first position, whereby the alarm body is reliably and cheaply secured to the alarm body.

According to another embodiment of the present invention, there is provided a pressure alarm device, further comprising: a sensor arm member in the alarm body, the means for sensing in the sensor arm member, the sensor arm member being extendable from the alarm body along a front face of the pressure gauge, and the sensor arm member positioning the means for sensing at the first desired position, whereby the sensor arm and the means for sensing do not detrimentally interfere with the users view of the front face and the needle during the use.

According to another embodiment of the present invention, there is provided a pressure alarm device, wherein: the sensor arm member includes one of a transparent and a translucent material.

According to another embodiment of the present invention, there is provided a pressure alarm device, wherein: the sensor arm rigidly extends from the alarm body along the front face.

According to another embodiment of the present invention, there is provided a pressure alarm device, further comprising: a pivot hinge, the pivot hinge pivotally joining the sensor arm to the alarm body, the pivot hinge enabling an extension of the sensor arm along the front face of the pressure gauge during the use, and the pivot hinge enabling a retraction of the sensor arm away from the pressure gauge prior to the use, whereby the user can easily view the pressure gauge during the use and position sensor arm and the means for sensing at the first desired position.

According to another embodiment of the present invention, there is provided a pressure alarm device, wherein: the alarm body includes a first indicator mark along a radian extending from the pivot, whereby the first indicator mark enables simple user alignment of the alarm body with a desired position on a pressure scale of the pressure gauge, and the means for sensing on the sensor arm positioned at a selected offset angle distant from the first indicator mark, whereby when the user aligns the first indicator mark with the desired position on the pressure scale, and pivots the sensor arm to extend along the front face, the sensor means is positioned at the first desired position the selected offset angle.

According to another embodiment of the present invention, there is provided a pressure alarm device, further comprising: at least one system controller in the alarm circuit means, the at least one system controller monitoring the alarm circuit during the use and determining a validity of the position signal based upon a predetermined acceptable position signal profile, and the system controller actuating the at least one alarm generating component, whereby the system controller prevents false alarm signals and conserves alarm circuit energy.

According to another embodiment of the present invention, there is provided a pressure alarm device, further comprising: at least one memory device in the alarm circuit means, the memory device retaining at least one validity parameter and the predetermined acceptable position signal profile, and the system controller comparing the position signal to the at least one validity parameter and the predetermined position signal profile during the use, whereby the system controller determines a validity of the position signal relative to both the at least one validity parameter and the acceptable position signal profile.

According to another embodiment of the present invention, there is provided a pressure alarm device, wherein: the visual alarm unit is at least one of an LED unit, a LCD unit, and an incandescent unit effective for generating the visual signal, the LED unit and the incandescent unit generating the visual signal as at least one of a constant and a flashing visual signal, the LCD unit generating the visual signal is at least one of a message alarm, an instructional alarm, and a warning alarm on an LCD screen, and the visual signal is at least one of a blinking message alarm on and a constant message alarm displayed the LCD screen.

According to another embodiment of the present invention, there is provided a pressure alarm device, wherein: the audible alarm unit is at least one of a speaker unit and a horn unit effective for generating the audible signal, the speaker unit including means for storing a recorded alarm message and issuing the recorded alarm message as the audible signal, and the horn unit including means for generating a tonal sound as the audible signal.

According to another embodiment of the present invention, there is provided a pressure alarm device, wherein: the mechanical alarm unit is at least one of an eccentric vibratory unit and a flag unit effective for generating the mechanical signal, the eccentric vibratory unit including means for providing vibration to the pressure alarm devise based upon a rotating weight eccentric to a rotational axis and for generating the mechanical signal as a vibration, and the flag unit including means for providing a visible mechanical flag on the pressure alarm device and for generating the mechanical signal as a motion of the visible mechanical flat.

According to another embodiment of the present invention, there is provided a pressure alarm device, wherein: the electronic signal unit is at least one of a wired and a wireless electronic signal unit, and the electronic signal unit effective for generating an electronic alarm signal and sending the alarm signal to a communications interface during the use, whereby the electronic signal includes information indicating at least one of an alarm condition of the pressure alarm device and an electronic resupply order for the pressure alarm device.

According to another embodiment of the present invention, there is provided a pressure alarm device, wherein: the electronic message signal unit is at least one of a wired and a wireless electronic signal unit, and the electronic message signal unit is effective for generating an electronic message alarm signal to a communications interface during the use, whereby the electronic signal includes information indicating at least one of an alarm condition of the pressure alarm device and an electronic resupply order for the pressure alarm device.

According to another embodiment of the present invention, there is provided, a pressure alarm device, comprising: a pressure alarm, a pressure gauge, the pressure gauge including an indicator needle operable about a pivot relative to a pressure scale upon an introduction of an external gas pressure, the pressure alarm including at least a first means for sensing at least a first desired position of the needle during a use of the pressure alarm device and for creating a corresponding position signal, alarm circuit means in the pressure alarm for receiving the position signal and for generating at least a one alarm signal, and means for supplying power to the alarm circuit means, whereby during the use when the external gas pressure is applied and the means for sensing and creating determines when the needle is at the first desired position and creates the corresponding position signal, the alarm circuit means generates the at least one alarm signal.

According to another embodiment of the present invention, there is provided a pressure alarm device, further comprising: at least one alarm generating component in the alarm circuit means, the at least one alarm component generating the at least one alarm signal, the at least one alarm component being one of an audible alarm unit, a visual alarm unit, an electronic signal alarm unit, an electronic message alarm unit, and a mechanical alarm unit, and the at least one alarm signal being at least one of an audible signal, a visual signal, an electronic signal, an electronic message signal, and a mechanical signal.

According to another embodiment of the present invention, there is provided a pressure alarm device, wherein: at least one system controller in the alarm circuit means, the at least one system controller monitoring at least the alarm circuit means during the use and determining at least a validity of the position signal based upon a predetermined acceptable position signal profile, and the system controller actuating the at least one alarm generating component, whereby the system controller prevents false alarm signals and conserves an alarm circuit energy.

According to another embodiment of the present invention, there is provided a pressure alarm device, further comprising: at least one memory device in the alarm circuit means, the memory device retaining at least one validity parameter and the predetermined acceptable position signal profile, and the system controller comparing the position signal to the at least one validity parameter and the predetermined position signal profile during the use, whereby the system controller determines a validity of the position signal relative to both the at least one validity parameter and the acceptable position signal profile.

According to another embodiment of the present invention, there is provided a pressure alarm device, wherein: the visual alarm unit is at least one of an LED unit, a LCD unit, and an incandescent unit effective for generating the visual signal, the LED unit and the incandescent unit generating the visual signal as at least one of a constant and a flashing visual signal, and the LCD unit generating the visual signal as at least one of a constant message alarm on an LCD screen and a blinking message alarm on the LCD screen.

According to another embodiment of the present invention, there is provided a pressure alarm device, wherein: the audible alarm unit is at least one of a speaker unit and a horn unit effective for generating the audible signal, the speaker unit including means for storing a recorded alarm message and issuing the recorded alarm message as the audible signal, and the horn unit including means for generating a tonal sound as the audible signal.

According to another embodiment of the present invention, there is provided a pressure alarm device, wherein: the mechanical alarm unit is at least one of an eccentric vibratory unit and a flag unit effective for generating the mechanical signal, the eccentric vibratory unit including means for providing vibration to the pressure alarm devise based upon a rotating weight eccentric to a rotational axis and for generating the mechanical signal as a vibration, and The flag unit including means for providing a visible mechanical flag on the pressure alarm device and for generating the mechanical signal as a motion of the visible mechanical flat.

According to another embodiment of the present invention, there is provided a pressure alarm device, wherein: the electronic signal unit is at least one of a wired and a wireless electronic signal unit, and the electronic signal unit effective for generating an electronic alarm signal and sending the alarm signal to a communications interface during the use, whereby the electronic signal includes information indicating at least one of an alarm condition of the pressure alarm device and an electronic resupply order for the pressure alarm device.

According to another embodiment of the present invention, there is provided a pressure alarm device, wherein: the electronic message signal unit is at least one of a wired and a wireless electronic signal unit, and the electronic message signal unit is effective for generating an electronic message alarm signal to a communications interface during the use, whereby the electronic signal includes information indicating at least one of an alarm condition of the pressure alarm device and an electronic resupply order for the pressure alarm device.

According to another embodiment of the present invention there is provided a pressure alarm system, adaptable to a pressure supply system, comprising: a pressure stem, the pressure stem in a pressure communication with the pressure supply system, the pressure supply system including at least one gas cylinder, at least a pressure diaphragm in a pressure communication with the pressure stem, at least one male pressure release device in an operable pressure communication with the pressure stem, whereby the at least one pressure release device enables filling external items with a pressurized gas released from the gas cylinder during a use, a pressure alarm device in a pressure communication with the pressure stem, comprising: at least a first pressure gauge and at least a first pressure alarm, the pressure gauge having an indicator needle operable about a pivot during the use, at least a first means for sensing at least a first desired position of the needle during the use and for creating at least a first corresponding position signal, alarm circuit means for receiving the position signal and for generating at least one alarm signal, both the means for sensing and creating and the alarm circuit means in the pressure alarm, and means for supplying power to the alarm circuit means, whereby during the use, when the means for sensing determines the needle is at the at least first desired position, the means for sensing creates the corresponding position signal and the alarm circuit means generates the at least one alarm signal.

According to another embodiment of the present invention there is provided a method of applying a pressure alarm device to an existing pressure gauge having a pressure indicator needle operable about a pivot, the method comprising the steps of: positioning the pressure alarm device on the pressure gauge, adjustably securing the pressure alarm to the pressure gauge, determining a users desired amount of warning prior to reaching an empty state on the pressure gauge, aligning means for sensing and creating in the pressure alarm device to sense at least a first desired position of the needle during a use of the gauge and create a corresponding position signal, the first desired position being the users desired amount of warning prior to reaching the empty state, and enabling an alarm circuit means in the pressure alarm device to receive the position signal and generate at least one alarm signal.

According to another embodiment of the present invention, there is further provided a method of replacing a pressure gauge, wherein the step of adjustably securing includes a step of engaging at least one of an elastomeric member system, a cover system, and an adhesive system as a means for adjustably positioning and securing the pressure alarm to the pressure gauge.

According to another embodiment of the present invention, there is provided a method of replacing an existing pressure gauge with a pressure alarm device, comprising the steps of: disconnecting the existing pressure gauge from a first pressure engagement, connecting the pressure alarm device to the first pressure engagement, the pressure alarm device comprising: a pressure alarm, a pressure gauge, the pressure gauge including an indicator needle operable about a pivot relative to a pressure scale upon an introduction of an external gas pressure, the pressure alarm including at least a first means for sensing at least a first desired position of the needle during a use of the pressure alarm device and for creating a corresponding position signal, alarm circuit means in the pressure alarm for receiving the position signal and for generating at least one alarm signal, and means for supplying power to the alarm circuit means, whereby during the use, when the external gas pressure is applied and the means for sensing and creating determines the needle is at the first desired position and creates the corresponding position signal, the alarm circuit means generates the at least one alarm signal.

According to another embodiment of the present invention, there is provided a pressure alarm device, according to claim 15, further comprising: at least means for receiving external electronic control signals in the at least one system controller, and the electronic control signals allowing an external operator to submit control instructions to the controller during the use and to store the control instructions in the at least one memory device, whereby the system controller enables an electronic control of the pressure alarm device from a remote communications position.

According to another embodiment of the present invention, there is provided a pressure alarm device, wherein: the means for receiving includes means for receiving the control signals via one of a wired and a wireless communication system, and the communication system including a communication interface with at least one of the world wide web, a cellular signal system, and a cellular paging system.

The above, and other objects, features and advantages of the present invention will become apparent from the following description read in conduction with the accompanying drawings, in which like reference numerals designate the same elements.

DETAILED DESCRIPTION OF PREFERRED EMBODIMENTS

In resolving the issues noted above, the present invention provides a pressure alarm device and system that overcomes the problems noted above.

Figure 1:
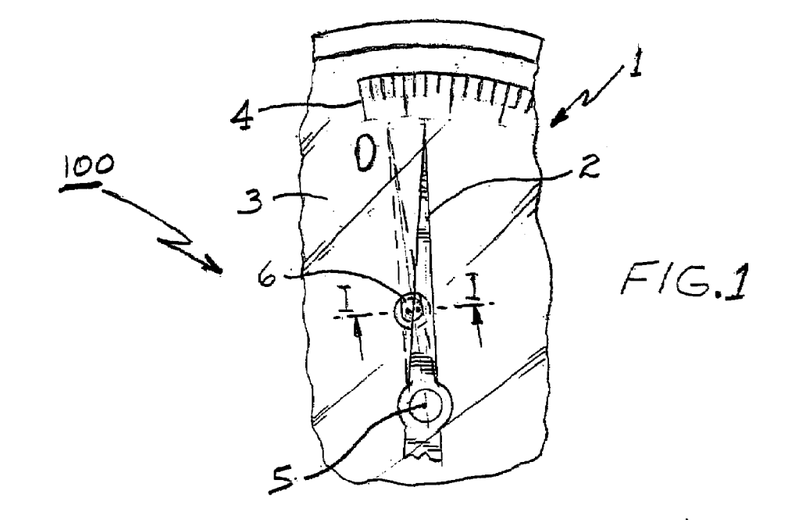
FIG. 1 is a partial view of a pressure alarm device according to one embodiment of the present invention.
Figure 2:
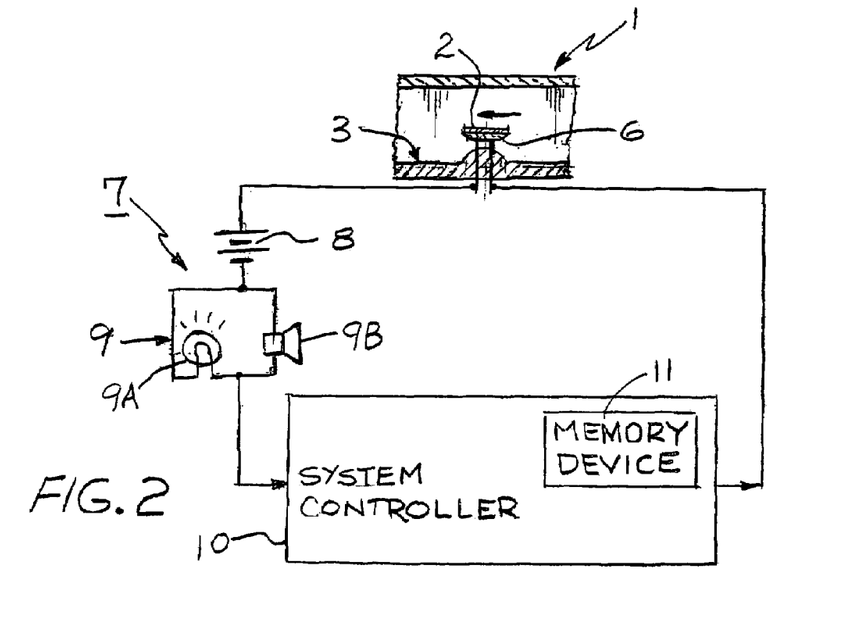
FIG. 2 is a combined circuit diagram and partial sectional view along line I-I in FIG. 1.

Referring now to FIGS. 1 and 2, a pressure alarm device 100, operates as at least a pressure alarm body, and includes a pressure gauge member 1 having a face 3 and a scale 4. A needle 2 pivots on a pivot 5 relative to scale 4 during a use. An alarm sensor 6, is one of an electrical, a mechanical pressure, a magnetic, or an optical contact trip sensor type of, and is positioned proximate a position selected by a manufacturer or customer, generally a zero reading on scale 4 below or at the plane of needle 2.

Contact trip 6 operably (generally electrically) connected with an alarm circuit 7. Alarm circuit 7 includes at least a circuit power source 8 and an alarm generator 9. The present embodiment includes both a light 9a and a horn/speaker 9b as alarm generators 9, but different visual, audible, electronic displays (for example to display a pager or emergency number), and even mechanical/vibratory alarm devices may be alternatively included.

During use, an operator operates pressure gauge 1 by opening a regulator valve (not shown) and applying a system pressure (gas cylinder pressure) to pressure alarm device 100. The system pressure drives needle 2 around pivot 5 relative to scale 4. The operator then operates the conventional unit (i.e. a grill or gas cylinder, both not shown) and fills an external balloon or other apparatus (both not shown) as required by a customer or operates a gas grill.

During continuous operation, the system pressure (gas cylinder pressure) drops and needle 2 rotates around pivot 5 relative to scale 4. As needle 2 reaches a position proximate the preselected position, shown as a zero (0) reading on scale 4, needle 2 trips alarm sensor 6 and completes alarm circuit 7 allowing electrical current to flow from power source 8 to alarm generator 9 (alarm devices 9a, 9b, or others).

Power source 8 may be any type of conveniently available power source including a solar power sources or a battery-based power source, including camera, flashlight, and hearing aid type batteries or direct system power from an external source. The requirements for power source 8 are that the power supplied be adapted to operation of alarm circuit 7 and alarm generator 9. As the focus of the present invention is on an inexpensive and portable pressure alarm device, power source 8 should be most frequently understood as a battery, but nothing herein shall prevent power source 8 from being any other type of conventional power source.

Adaptations to the present embodiment may additionally include an alarm circuit system controller 10 or a memory device 11 linked with and controlling alarm circuit 7. In the embodiment shown, system controller 10 is in an operative control of alarm circuit 7 and any devices attached thereto. System controller 10 may be programmed with variables including a duration, an intensity, and a selection of any alarm given by alarm generator 9 (light 9a, horn 9b, etc.) or other included alarm device. Memory device 11 may be designed to retain any number of alarm variables, including the number of times trip alarm sensor 6 has actuated since a reset, and may provide an alternative-feed back loop (not shown) with system controller 10 and prevent actuation of alarm circuit 7 except during an actual pressure reduction (odd integer operations). In this manner, alarm circuit 7 will only actuate during low pressure readings of pressure alarm device 100 and not during an initial opening of pressure gauge 1 as needle 2 sweeps past alarm sensor 6 to a high pressure reading.

In additional embodiments, system controller 10 may be operably and controllably linked with a communications interface, for example a modem or wireless router. The communications interface may then be connected with an external control system such as the world wide web. In this manner, alternative embodiments of the present pressure alarm device may either send messages or emails of alarm or re-order or receive alarm controls from an external control, for example a home computer.

Referring now to FIGS. 3 through 6B, a pressure alarm device 101, acting as pressure alarm body 101, includes a pressure gauge 30 having a face 32 and a scale 33. A needle 31 pivots on a pivot 34 relative to scale 33 during a use.

An alarm circuit 36, including at least a set of alarm components sensors 36a, is positionable proximate a desired reading on scale 33, frequently but not necessarily just above a zero reading, and includes multiple alarm generators 35 (alarm components 35), as will be described. Alarm circuit 36 includes at least a power source 43 and alarm generators 35. As shown, both a light 44a and a horn 44b are included in alarm generators 35 as alarm devices, but different visual, audible, electronic, or mechanical/vibratory alarm devices may be included.

In the present embodiment, alarm circuit 36 includes at least a Light Emitting Diode (LED) emitter 38 and an LED receiver 39 (sensor 39) as alarm sensor components 36A, but alternative combinations or substitutions of alternative alarm components may be made without changing the nature of the present embodiment.

Needle 31 includes a preferred sensor surface 40. Sensor surface 40 is selected by a customer and may be one of either a reflective or an absorptive surface designed to interact with LED emitter 38 and LED receiver 39, as will be described. Where a customer selects a conventional pressure gauge 30 for incorporation with into pressure alarm device 101, alarm sensors 36A may be selected for optimal effectiveness relative to the surface characteristics of needle 31.

Figure 3:
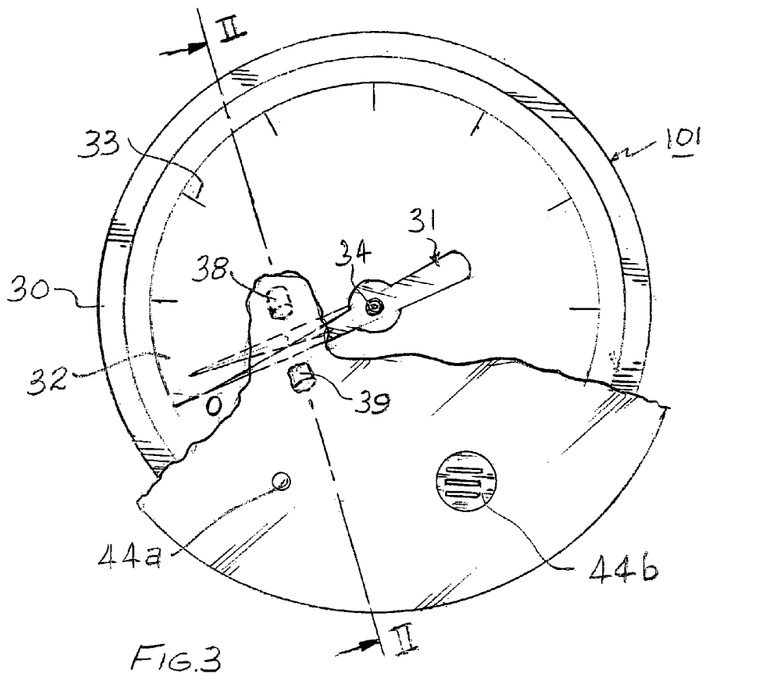
FIG. 3 is a partial view of a pressure alarm according to another embodiment of the present invention.
Figure 4:
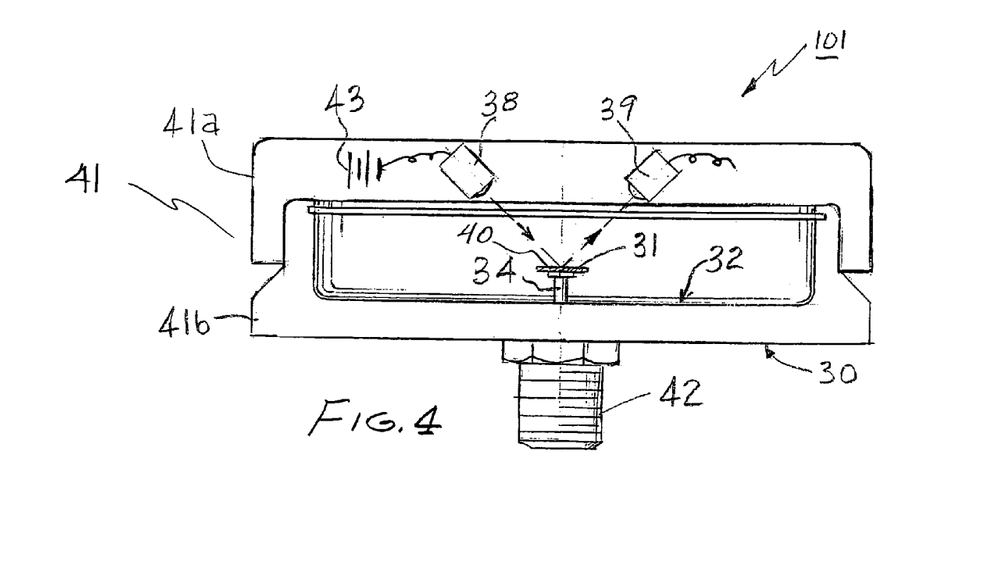
FIG. 4 is a sectional view along line II-II in FIG. 3.
Figure 5:
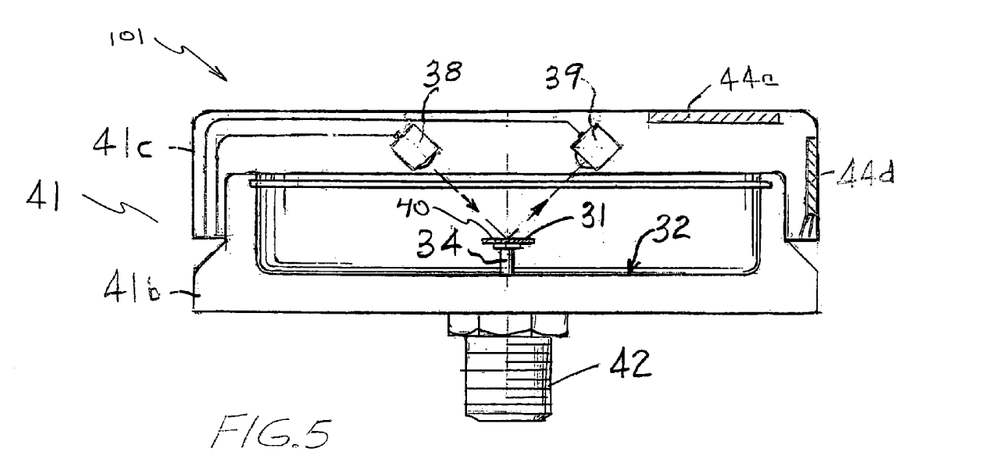
FIG. 5 is a partial sectional view along II-II in FIG. 3, according to another embodiment of the present invention.

A cover system 41 suspends LED's 38, 39 and selected alarm components 35 in alarm circuit 36 on pressure gauge 30. Cover system 41 includes a front cover 41A and a back cover back 41B. Cover system 41 surrounds a portion of pressure gauge 30. As shown, front cover 41A is glued to back cover 41B and fixed, but alternative means of joining front cover 41A and back cover 41B may include an elastic snap joint. It should be noted that front cover 41A is rotationally positionable and repositionable relative to face 32 before and after it is joined with back cover 41B. In this manner, a user may select or reselect a desired 'zero' position for alarm sensors 36A.

Those skilled in the art will readily recognize the benefits afforded by the present invention since cover system 41 (and respective front and back covers 41A, 41B), which allow pressure alarm device 101 to be easily adapted to preexisting pressure gauges 30 without destruction. Since the present invention does not require replacement of pressure gauges 30, additional economic benefits and convenience exits.

Those skilled in the art should additionally recognize that the present cover system may alternatively include multiple ways to secure and repositionably position sensors and emitters on the pressure gauge. One envisioned embodiment for the cover system provides a front cover alone with extending retaining arms reaching to a back surface of the pressure gauge and holding the front cover in position.

A threaded member 42 operably joins pressure gauge 30 to an external system pressure, from a gas cylinder or boiler type unit, and allows pressure gauge 30 to operate.

As shown, alarm components 35 are positioned and retained, at least partially, in a portion of cover system 41 for easy visual, audible, or vibratory perception by a user. Alternatively, alarm components 35 may be positioned throughout pressure alarm device 101 where convenient for a manufacturer or user.

Alternative embodiments of the present invention may also include alarm components 35 of any manner best able to gain the immediate attention of a user. As examples, an alternative cover 41C may contain alarm components 35 alternatively include LCD displays 44c, 44d, covering all or a portion face 32, and provide a message to a user (for example, instructions to call a pager or emergency number). This type of warning message may include some type of notice, or warning, or instruction to a user regarding the state of the read pressure.

As noted above, during use an operator operates pressure gauge 30 by opening a regulator valve (not shown) and applying a system pressure (gas cylinder pressure or boiler system) to pressurize alarm device 101. In the case of a balloon cylinder, the operator then operates a conventional filling adaptor (not shown) and fills an external balloon or other apparatus (both not shown) as required by a customer. In the case of an LB type cylinder, the operator then conventionally operates a grill or heating apparatus. In the case, where the one of the present embodiments reads on a boiler system, the operator operates the boiler.

During continuous operation, the system (gas cylinder or boiler) pressure drops and needle 31 rotates around pivot 34 relative to scale 33. As needle 31 approaches a zero (0) reading on scale 33, sensor surface 40 on needle 31, interrupts a signal emitted from LED emitter 38 to LED receiver 39 and completes alarm circuit 36 allowing electrical current to flow from power source 43 to alarm generators 35 (devices 44a, 44b).

Figure 6A:
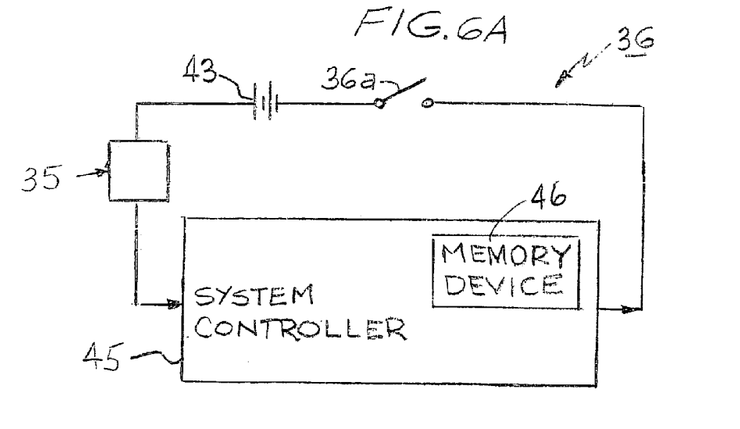
FIG. 6A is a schematic diagram of one embodiment of the pressure alarm device shown in FIG. 3.
Figure 6B:
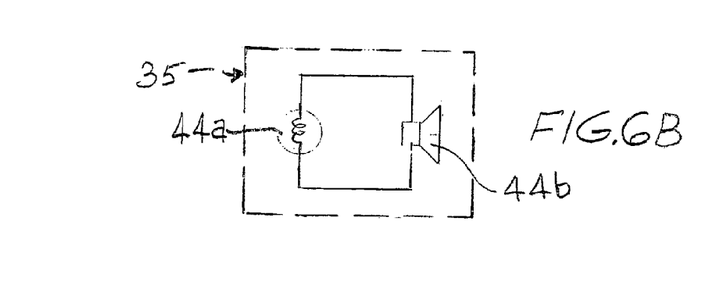
FIG. 6B is a partial schematic diagram of the alarm generator as shown in FIG. 6A containing selected alarm components.

Power source 43 may be any type of conveniently available power source including solar power sources or batteries including miniature camera, flashlight, hearing-aid type batteries, as well as direct line current. The main requirement for power source 43 is that the power supplied be adapted to effectively operate alarm circuit 36.

As noted above, since the focus of the present invention is on an inexpensive and portable pressure alarm device, power source 43 should be most frequently understood to be a battery, but nothing herein shall prevent power source 43 from being any other type of suitable power source recognizable by one skilled in the art.

Adaptations to the present embodiment may additionally or alternatively include incorporating an alarm loop system controller 45 and a memory device 46 in alarm circuit 36.

Where, alarm circuit 36 includes system controller 45, system controller 45 is in an operative control of alarm loop 36 and any devices attached thereto. System controller 45 may be programmed with variables including, but not limited to, the duration and intensity of any alarm given by alarm generators 35 (light 44a, horn 44b, or an alternative eccentric vibrator (not shown)). Memory device 46 may retain the number of times control loop 36 has actuated as well as other information, and in an alternative feed back loop with system controller 45 and memory device 46 (not shown), may prevent actuation of alarm circuit 36 except during odd integer operations. In this manner, alarm loop 36 would only actuate during a low pressure reading of pressure alarm device 101, not during an initial opening of pressure gauge 30.

In an additional embodiment, system controller 45 may additionally include means for communicating with a communications interface (shown later), for example a microprocessor and a modem (wired or wireless) or a router. The communications interface may thereafter be configured to communicate with an external controller for example a personal computer. In this manner, the system controller 45 of the present embodiment may send as an alarm an email message and/or a restocking order from a supplier. In either case, memory device 46 may additionally store email addresses and other software elements necessary to send and alarm notices. It is envisioned that an additional embodiment to the present invention include means, through system controller 46 to remotely update or reset alarm signals via the world wide web.

Referring now to FIGS. 7 through 10, a pressure alarm device 102 includes a pressure alarm body 102A joined with a pressure gauge 60 by an elastomeric member 70. Pressure alarm body 102A includes a rigid body 67 and opposing body arms 68A, 68B. Body arms 68A, 68B extend from rigid body 67 and provide a smooth stabilizing surface between pressure gauge 60 and rigid body 67. Pressure gauge 60 includes a face 62 having a scale 63. A needle 61 pivots about a pivot 64 relative to scale 63.

Elastomeric member 70 surrounds pressure alarm body 102A and pressure gauge 60 and elastically urges rigid body 67 and body arms 68A, 68B into close contact with an outer circumference of pressure gauge 60. The present embodiment may be easily rotationally positioned around the outer circumference as desired, and even removed and repositioned on conventional pressure gauges. Consequently, the present embodiment is convenient to use and does not require costly replacement of conventional pressure gauges.

A sensor arm 66 extends from rigid body 67, and is conveniently made from any type of translucent or transparent rigid material, for example Lexan® or polycarbonate, but maybe opaque depending upon manufacturer or customer desires. It is sufficient that sensor arm 66 retain sensors and be conveniently positionable in a desired location. Sensor arm 66 extends toward pivot 64 and cantilevers slightly above a top gauge surface of pressure gauge 60.

Figure 10:
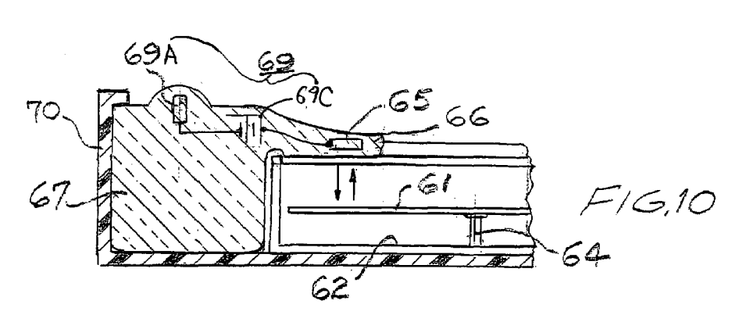
FIG. 10 is a partial sectional view of the pressure alarm device along line III-III in FIG. 7.

At least one alarm sensor 65 is positioned in sensor arm 66 and is one of an optical intensity and a reflective-type sensor capable of determining a position of needle 61 relative to alarm sensor 65 against a background intensity or reflectivity of face 62. FIG. 8 indicates an embodiment including multiple alarm sensors similar to the previous embodiments. FIG. 10 indicates an embodiment having a single alarm sensor 65. In any embodiment, an operator skilled in the art will readily recognize the interchangeable nature of alarm sensors 65 depending upon commercial demand, cost, and the design of face 62 in pressure gauge 60.

An alarm circuit 71 includes one or more alarm circuit leads 71A extending from selected alarm sensors 65. Alarm circuit 71 includes alarm generating components 69, namely a light emitter 69A (single or multiple LEDs or an LCD display capable of displaying a message), an audio emitter 69B (horn or speaker), and a power source 69C. Alarm circuit 71 may additionally include a system controller and a memory device similar to those described before, both not shown, performing similar system control and memory support functions in manners as would be commonly understood by one skilled in the art of system control. As with each of the above embodiments, power source 69C may alternatively be an external power supply, a battery-based power supply, or some form of solar cell power supply. As with each of the above embodiments, the alarm circuit 71 may be controlled or updated by the system controller via the world wide web. The system controller is also enabled to send alarm messages and/or re-order or re-stocking emails to a designated supplier of the gas cylinders, or in the case of a boiler, may email a repair person to refill the liquid boiling medium.

Figure 11:
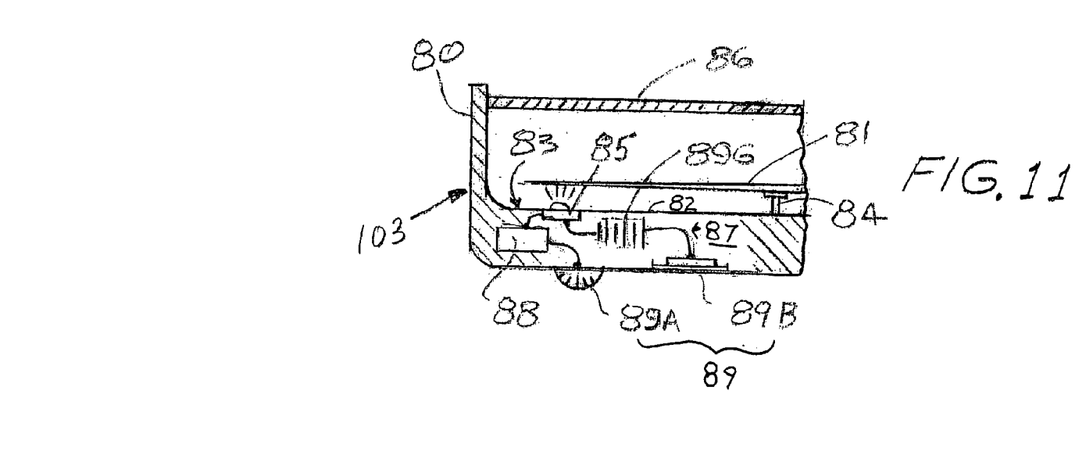
FIG. 11 is a partial cross-sectional view of a pressure alarm device according to another embodiment of the present invention.

Referring now to FIG. 11, a pressure alarm device 103, alternatively pressure alarm body 103, includes an adapted pressure gauge 80 having a scale 83 on a face 82. A needle 81 pivots relative to a pivot 84.

An alarm circuit 87 includes an alarm sensor 85 opposite a cover glass plate 86 in pressure gauge 80. As described, alarm sensor 85 is an optical intensity sensor, which is capable of detecting a light intensity difference between when needle 81 is positioned over alarm sensor 85 (blocking external light sources), and when needle 81 is not over alarm sensor 85 (allowing external light sources to reach sensor 85). As with the other optical sensor systems noted above, a signal intensity changes based upon a position of needle and actuates alarm circuit 87 accordingly.

Alarm circuit 87 additionally includes alarm-generating components 89. Alarm generators 89 include a light emitter 89A and a horn/speaker-type audible emitter 89B, but multiple types of additional alarm-generating components may also be includes allowing vibration, LCD display messages, email warnings, re-order messages, pager numbers to call, etc.

During operation, as needle 81 limits an optical intensity determined by alarm sensor 85, alarm circuit 87 actuates alarm generators 89 and warns a user of a low-pressure status in the attached compressed gas cylinder (not shown) or in an attached boiler (also not shown).

As noted above, in the present embodiment, alarm circuit 87 may additionally include a system control module 88 including a system controller and/or a memory device (both not shown) as well as a power source 89C. The system controller and/or memory device in system control module 88 incorporate each of the control and programming abilities as earlier noted.

Figure 7:
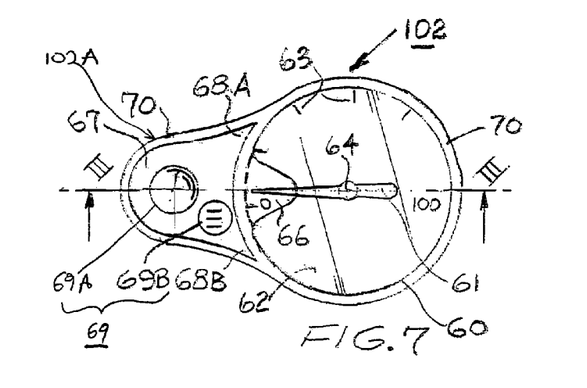
FIG. 7 is a top view of a pressure alarm device according to another embodiment of the present invention.
Figure 8:
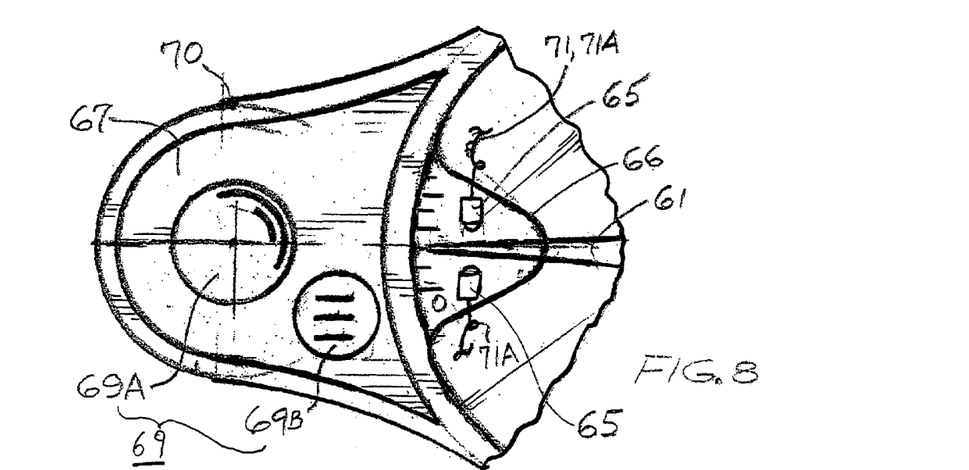
FIG. 8 is partial top view of the pressure alarm device as shown in FIG. 7.
Figure 9:
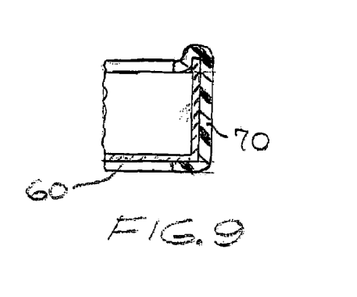
FIG. 9 is a partial sectional view of the pressure alarm device along line III-III in FIG. 7.
Figure 12:
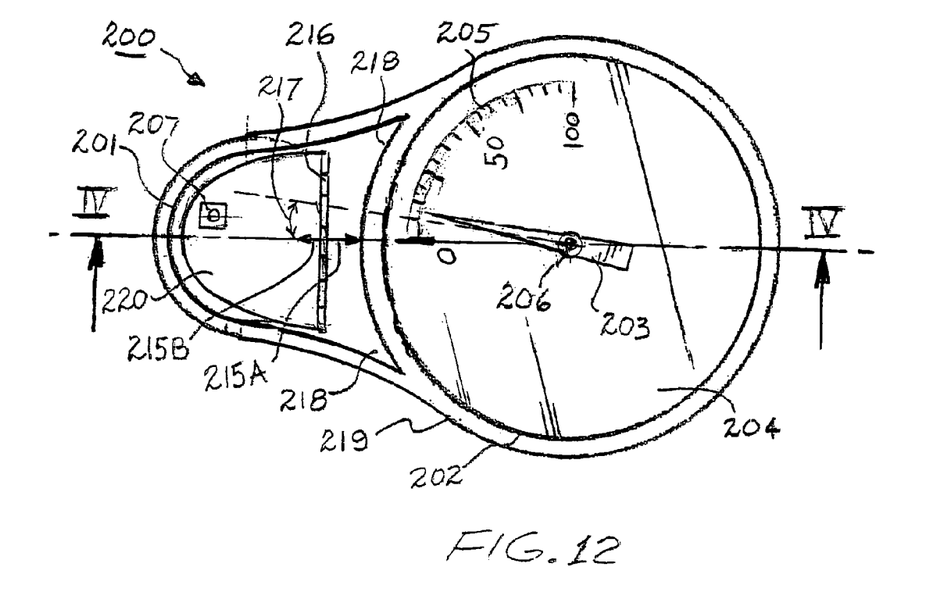
FIG. 12 is a top view of a pressure alarm device in an open position according to another embodiment of the present invention.
Figure 13:
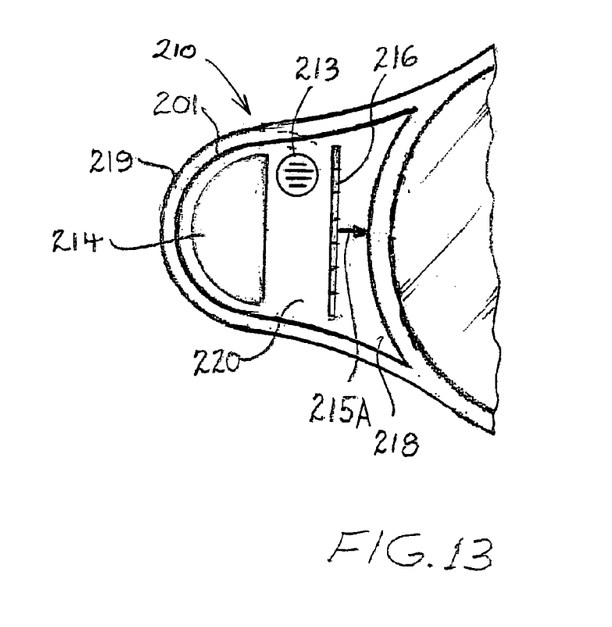
FIG. 13 is a partial top view of the pressure alarm device as shown in FIG. 12 in a closed position.
Figure 14:
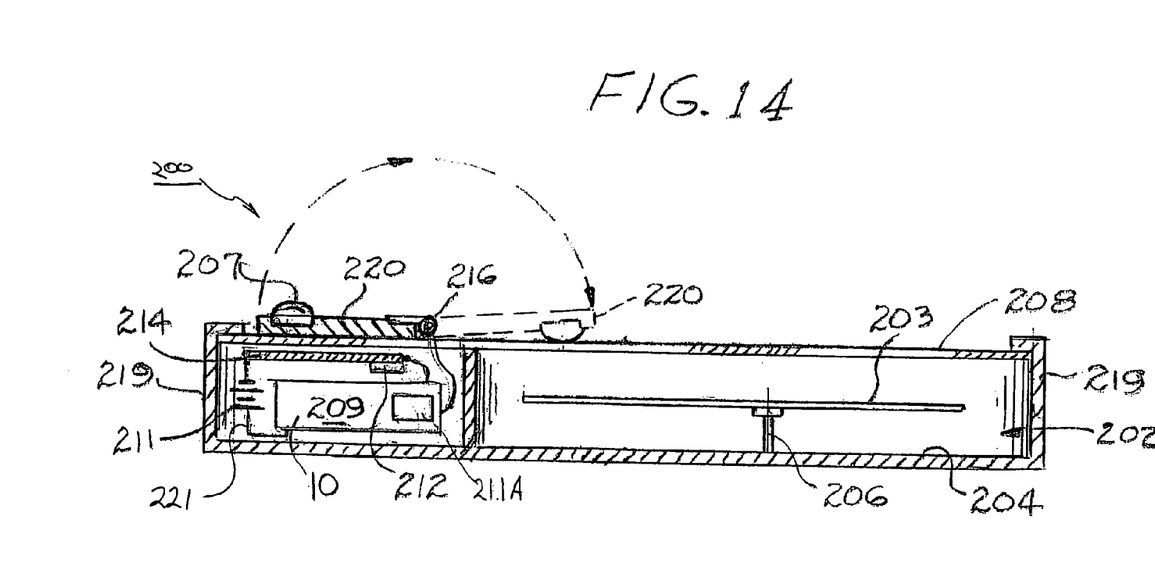
FIG. 14 is a sectional view along line IV-IV in FIG. 12 of a pressure alarm device in both opening and closed positions.

Referring now to FIGS. 12 through 14, a pressure alarm device 200 includes a pressure alarm body 201 shaped similarly to the embodiment shown in FIG. 7. Pressure alarm body 201 includes a pair of support arms 218, 218 (alternatively body arms). An elastomeric member 219 elastically connects pressure alarm body 201 with a pressure gauge 202. Pressure gauge 202 includes cover glass 208 opposite a face 204 having a scale 205. A needle 203 pivots about pivot 206 relative to scale 205 during use of the present embodiment. As shown, a first alignment indicator 215A visually marks a centerline of pressure alarm body 201 relative to a center of pressure gauge 202. Since elastomeric member 219 enables an operator to rotatably position pressure alarm body 201 about an outer circumference of pressure gauge 202, first alignment indicator 215A enables the operator to accurately position alarm body 201 relative to scale 205. An alarm sensor system 207 is positioned on a transparent sensor arm 220 pivotable about a pivot hinge 216 relative to pressure alarm body 201.

During use, in an alignment step, an operator uses first alignment indicator 215A to position alarm body 201 in a desired position on pressure gauge 202 and scale 205. During an engagement step, an operator rotates sensor arm 220 about pivot hinge 216 into a position placing alarm sensor system 207 proximate cover glass 208. A second alignment indicator 215B is on a centerline of sensor arm 220 and overlays first alignment indicator 215A in the engaged or closed position for sensor arm 220. In this manner, an operator can easily confirm that both alarm body 201 and sensor arm 220 are co-aligned relative to a desired position on scale 205.

An alarm circuit 221 joins alarm sensor system 207 with a control module 209 and alarm components 210. Alarm components 210 include a power source 211 and a visual alarm emitter 212, an audible alarm emitter 213, and a alarm display (LCD) 214 similar to those described above. Control module 209 operates to control alarm circuit 221 and minimize false alarm signals. Control module 209 may additionally include an memory module 211A, or another type of enabling memory module (not shown).

The present embodiment additionally includes alarm display 214 operably linked to alarm circuit 221 and alarm sensor system 207. Alarm display 214 is an LCD-type display capable of displaying both an alarm signal, a pager or alarm number to call, or basic instructions or feed-back, for example, that an email-order has been placed or alarm email sent. It will be readily understood by those skilled in the art, that alarm display 214 may be operably or alternatively combined with visual alarm emitter 212 as a backlight for the LCD display, or may remain separate allowing alarm display 214 to display a predetermined alarm message or warning with an adjacent blinking light (visual alarm emitter 212).

As shown, alarm sensor system 207 is positioned on sensor arm 220 with an offset 217 predetermined by a manufacturer. Offset 217 is the selected number of degrees, relative to pivot 206, which separates alarm sensor system 207 from alignment indicators 215.

Offset 217 allows an operator to conveniently align alignment indicators 215A, 215B on the zero reading of scale 205 while maintaining a predetermined safety offset (for example, five (5) degrees or 5 psi). Consequently, an operator receives a low-pressure warning alarm prior to completely emptying a pressure cylinder.

It should be additionally understood, that control module 209 may be oparably connected with a communications interface, such as a modem or electronic router. The communications interface may in turn be connectable with an external controller, for example a home computer or other microprocessor. In this manner, the present embodiment may send alarm or instructive message, or receive controlling data similar to the above-described embodiments.

Figure 15:
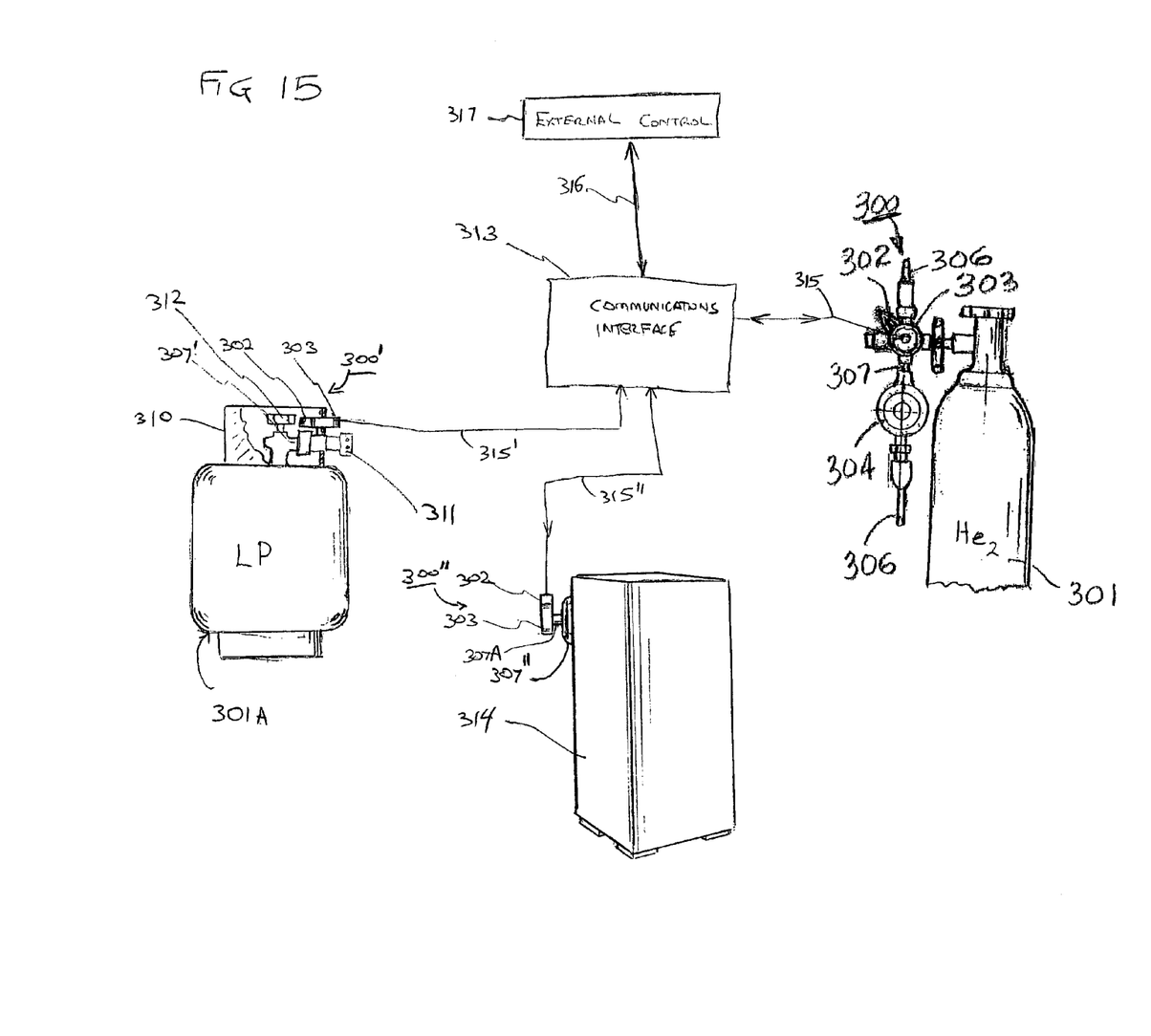
FIG. 15 is a schematic view of alternative embodiments of the pressure alarm device operationally linked with a pressure alarm communication interface, allowing wired or wireless and informational or directive communication with an external control.

Referring now to FIG. 15, schematic descriptions of alternative embodiments of the present invention each provides a pressure alarm system 300, 300', and 300" respectively adapted to a gas cylinder 301, an LP gas cylinder 301A, and a boiler or hot water heater 314. Each of the previously disclosed embodiments of the present invention may be alternatively represented by pressure alarm systems 300, 300', and 300", which are used a representative pressure alarm systems adapted to various employment environments. In each representative embodiment, a pressure alarm body 302 is operably joined to or provided integrally with a pressure gauge 303, as earlier discussed.

Each pressure alarm system 300, 300', 300" is in electronic (wired or wireless) communication with a communications interface 313 via respective communication pathways 315, 315', and 315". Communications interface 313 communicates electronically with an external control via communication pathway 316, as will be described.

Where pressure alarm system 300 is adapted to a Helium containing-type gas cylinder 301, pressure alarm system 300 includes a pressure stem 307, threadably and securely mating with gas cylinder 301. Conventional mating connections between gas cylinder 301 and pressure stem 307 may be alternatively used. Pressure stem 307 extends to a pressure control manifold section (shown but not numbered) and a pressure diaphragm 304, used in accessing and releasing a compressed gas retained in gas cylinder 301. A singular or multiple male pressure fittings 306 (here shown with two pressure fittings 306, 306) extend from pressure stem 307 proximate pressure alarm body 302.

In the present embodiment of pressure alarm system 300, any of the previously described pressure alarm embodiments may be adapted for use in registering the operable pressure within pressure stem 307 and gas cylinder 301. Male pressure fittings 306, 306 may be provided singularly or on a multi-headed stem depending upon manufacturer and customer desire and may be adaptable to a variety of pressure containers of differing designs. For example, pressure containers may include mylar balloons, rubber balloons, double layer balloons (with an inner balloon and an outer balloon), advertising displays, and other pressure containers having various pressure fittings that may require different male pressure fittings to fully inflate.

In another alternative embodiment, gas cylinder 301A is a propane (LP) gas cylinder 301A suitable for use with an out-door grill (not shown). In this embodiment, a pressure stem 307' extends from a control valve 312. In this embodiment, pressure alarm system 300' is positioned between control valve 312 and a quick disconnect fitting 311. Conventionally, an additional safety and carry shield 310 surrounds and protects pressure stem 307' and control valve 312. In use, a braided metal hose (not shown) connects via fitting 311 and operably joins LP gas cylinder 301 to a grill or outdoor heating device (both not shown).

In yet another alternative embodiment, gas cylinders 301, 301A are replaced with a boiler/hot water heater 314 having an alternative pressure stem 307" extending outside an operational surface of boiler 314. A portion of pressure stem 307" extends into a pressure stem fitting 307A joining pressure stem 307" with pressure alarm system 300", as shown. One skilled in the art of pressure measurement will also recognize that the alternative fitting arrangements may be created to supply system pressure to the pressure alarm system 300".

In the present embodiment, pressure alarm systems 300, 300', 300" are adaptable to include each of the alternative pressure alarm systems described above depending upon manufacturer or customer need. The present embodiment provides a simple pressure alarm system 300, 300', and 300", which are easily adaptable to a variety of gas cylinders 301, 301A, or boilers 314.

In each embodiment shown in FIG. 15, pressure alarm systems 300, 300', and 300" each including pressure alarm bodies 302 are each operably connectable with related communications interface 313 via respective electronic communication pathways 315, 315', and 315", as shown. Pathways 315, 315', 315" may be either wired or wireless pathways known to those skilled in the art of electronic communication, and communications interface 313 may be any type of known interface enabled to receive electronic signals from system controllers (not shown) each existing within respective pressure alarm systems 300, 300', and 300" and transmit the same to an external control 317. Similarly, in operation, external control 317 may receive and send instructive signals to alarm systems 300, 300', and 300"

via wired or wireless communications interface. For example, alarm systems 300, 300', and 300" may both generate an alarm signal via a display and simultaneously send a pager or email alarm to external control 317. The external control 317, upon receiving the alarm signal, may generate a responsive control signal, for example an instruction to order a replacement gas cylinder or to perform maintenance of some kind, and send it back to respective alarm systems 300 via communications interface 313.

In each of the above embodiments, the present invention enables several forms of easily perceived visual, audible, electronic, or vibratory signals immediately adjacent the pressure gauge, or communicated electronically. Consequently, each of the embodiments provides a simple way to notify an unsophisticated or untrained operator of the need to order or locate a replacement compressed gas cylinder prior to actual pressure loss, while enabling alarm notice or re-order/resupply directions to a more sophisticated owner or operator.

Another benefit of the present invention is that the embodiments are alternatively adaptable for either complete replacement of a conventional pressure gauge with one of the embodiments having pressure alarm devices incorporating a pressure gauge, or simply adapting a pressure alarm device to an existing conventional pressure gauge. In either case, due to the ease of replacement or attachment, the present invention enables an inexpensive way to improve operator awareness.

Where one embodiment of the present invention is joined to a conventional pressure gauge, with an elastomeric member or in a cover system, the present invention allows an operator to rotationally position the pressure alarm system or pressure alarm body in a desired location relative to a pressure scale and needle. Consequently, an operator can actuate a low-pressure alarm at any desired pressure level depending upon a supplier's lead-time. For example, an operator may set the pressure alarm to operate at a 40 psi level where supply lead times are several days and may operate at a 5 psi level where supply lead times are a few hours. In either case, the present invention allows an operator to adapt the pressure alarm device to their existing situation for maximum convenience.

One skilled in the art of electromechanical alarm design should readily recognize that the alignment arms discussed operate as support and guiding arms or members to stabilize the alarm body relative to the pressure gauge and may be readily replaced with alternative structures providing an equivalent result in an equivalent way.

Additionally, multiple methods of joining front and back covers together while permitting relative exist and are adopted herein, including adhesive-based and spring-based methods. One particularly useful method of snap-joining two covers includes a male/female snap portion on respective front and back covers. As the covers are closed about the pressure gauge, the covers snap together yet are relatively rotatable allowing a position sensor to be repositioned as needed.

While the present disclosure reviews various types of alarm signals, including visual (instructional alarm and/or directive type alarm), audible, electronic messaging (a notice or re-order message or both), and mechanical signals, one skilled in the art of alarm signal generation should recognize that multiple alternative methods of generating alarm signals exist. It should be further recognized that the present invention permits multiple combinations of alarm signals, i.e. visual/audible, audible/mechanical, electronic/audible, etc.

While the present invention may draw particular attention to a defined pressure alarm body, an alarm unit, or an alarm component, these phrases should be understood as generally interchangeable types of alarms mechanisms and alarm containers (including audible, visual, and mechanical alarms) by those skilled in the art as long as the invention, as disclosed in the multiple embodiments provided, is capable of determining a desired or selected alarm/needle position and providing an associated alarm signal.

Alternative embodiments of the present invention may also include a specially adapted cover member, containing all the elements of a sensor/alarm circuit that snap fits or otherwise adaptively attaches to a face of a conventional pressure gauge. In this manner, the present invention may be retrofitted to existing pressure regulator gauges and eliminate the problems noted above while not requiring purchase of a new pressure regulator gauge and the trouble associated with retrofitting existing conventional control systems.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of at least one wooden part, in the environment of fastening wooden parts, a nail, a screw, and a bolt may be readily understood by those skilled in the art as equivalent structures.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included without departing from the scope or spirit of the invention as defined in the following claims.

What is claimed is:

1. A pressure alarm device, for a pressure gauge having an indicator needle operable about a pivot, said pressure alarm device comprising:
   an alarm body;
   at least a first means for sensing at least a first desired position of said needle relative to said pivot during a use of said pressure gauge and for creating a corresponding position signal;
   said means for sensing and creating operably joined to said alarm body;
   means for retaining said alarm body proximate said pressure gauge and for positioning said means for sensing relative to said first desired position;
   alarm circuit means for receiving said position signal and for generating at least one alarm signal;
   said means for receiving and generating operably joined to said alarm body; and
   means for supplying power to said alarm circuit means, whereby during said use when said means for sensing and creating determines said needle is at said at least first desired position and creates said corresponding position signal, said alarm circuit means receives said position signal and generates said at least one alarm signal; further comprising:
   at least one alarm generating component in said alarm circuit means;

said at least one alarm component generating said at least one alarm signal;

said at least one alarm component being at least one of an audible alarm unit, a visual alarm unit, a wired electronic message alarm unit, a wireless electronic message alarm unit, and a mechanical alarm unit; and said at least one alarm signal being at least one of an audible signal, a visual signal, an electronic signal, an electronic message signal, and a mechanical signal, whereby said one at least one alarm component is effective to notify a user of said alarm signal, said means for retaining and positioning said alarm body proximate said pressure gauge includes at least one of an elastomeric member system, a cover system, and an adhesive system;

said elastomeric member system including an elongated elastic member;

said elastic member elastically retaining and repositionably holding said alarm body relative to an outer circumference of said pressure gauge;

said elastic member enabling said user to position and retain said alarm body along said outer circumference relative to said first desired position; and said elastic member urging said alarm body into a stabilizing close contact with said outer circumference during said use, whereby said means for sensing reliably senses said needle relative to said first desired position during said use.

2. A pressure alarm device, according to 1, further comprising:

a pair of support arms extending outward from said alarm body;

said support arms including concave contact surfaces; and said elastic member urging said concave contact surfaces into a mating contact with a selected convex portion of said outer circumference during said use, whereby said support arms align said alarm body with said pressure gauge during said use and guide said alarm body about said outer circumference during repositioning.

3. A pressure alarm device, for a pressure gauge having an indicator needle operable about a pivot, said pressure alarm device comprising:

an alarm body;

at least a first means for sensing at least a first desired position of said needle relative to said pivot during a use of said pressure gauge and for creating a corresponding position signal;

said means for sensing and creating operably joined to said alarm body;

means for retaining said alarm body proximate said pressure gauge and for positioning said means for sensing relative to said first desired position;

alarm circuit means for receiving said position signal and for generating at least one alarm signal;

said means for receiving and generating operably joined to said alarm body; and means for supplying power to said alarm circuit means, whereby during said use when said means for sensing and creating determines said needle is at said at least first desired position and creates said corresponding position signal, said alarm circuit means receives said position signal and generates said at least one alarm signal; further comprising:

at least one alarm generating component in said alarm circuit means;

said at least one alarm component generating said at least one alarm signal;

said at least one alarm component being at least one of an audible alarm unit, a visual alarm unit, a wired electronic message alarm unit, a wireless electronic message alarm unit, and a mechanical alarm unit; and said at least one alarm signal being at least one of an audible signal, a visual signal, an electronic signal, an electronic message signal, and a mechanical signal, whereby said one at least one alarm component is effective to notify a user of said alarm signal, said means for retaining and positioning said alarm body proximate said pressure gauge includes at least one of an elastomeric member system, a cover system, and an adhesive system;

said cover system includes at least a cover front and a cover back;

said means for sensing and for creating said position signal in said cover front;

said cover front covering at least a portion of a face of said pressure gauge;

said cover back covering at least a portion of a back of said pressure gauge; and means for connecting and positioning said cover front relative to said cover back enabling an alignment of said means for sensing and creating relative to said at least first desired position, whereby said cover system enables ready adaptation of said pressure alarm device to preexisting said pressure gauge.

4. A pressure alarm device, according to claim 3, further comprising:

a sliding snap lock connection in said means for connecting and positioning;

said sliding snap lock connection including a sliding-snap male member and a sliding-snap female member on respective said cover front and said cover back; and said sliding-snap male member and said sliding-snap female member enabling positive engagement between said cover front and said cover back while permitting rotation of said cover front relative to said pressure gauge, whereby said user may reposition said means for sensing relative to said needle during said use.

5. A pressure alarm device, according to claim 3, wherein:

said adhesive system fixably joins alarm body to said pressure gauge after a positioning of said means for sensing relative to said at least first position, whereby said alarm body is reliably and cheaply secured to said alarm body.

6. A pressure alarm device, for a pressure gauge having an indicator needle operable about a pivot, said pressure alarm device comprising:

an alarm body;

at least a first means for sensing at least a first desired position of said needle relative to said pivot during a use of said pressure gauge and for creating a corresponding position signal;

said means for sensing and creating operably joined to said alarm body;

means for retaining said alarm body proximate said pressure gauge and for positioning said means for sensing relative to said first desired position;

alarm circuit means for receiving said position signal and for generating at least one alarm signal;

said means for receiving and generating operably joined to said alarm body; and means for supplying power to said alarm circuit means, whereby during said use when said means for sensing and creating determines said needle is at said at least first desired position and creates said corresponding position signal, said alarm circuit means receives said position signal and generates said at least one alarm signal; further comprising:

at least one alarm generating component in said alarm circuit means;

said at least one alarm component generating said at least one alarm signal;

said at least one alarm component being at least one of an audible alarm unit, a visual alarm unit, a wired electronic message alarm unit, a wireless electronic message alarm unit, and a mechanical alarm unit; and said at least one alarm signal being at least one of an audible signal, a visual signal, an electronic signal, an electronic message signal, and a mechanical signal, whereby said one at least one alarm component is effective to notify a user of said alarm signal, a sensor arm member in said alarm body;

said means for sensing in said sensor arm member;

said sensor arm member being extendable from said alarm body along a front face of said pressure gauge; and said sensor arm member positioning said means for sensing at said first desired position, whereby said sensor arm and said means for sensing do not detrimentally interfere with said users view of said front face and said needle during said use.

7. A pressure alarm device, according to claim 6, wherein:

said sensor arm member includes one of a transparent and a translucent material.

8. A pressure alarm device, according to claim 6, wherein:

said sensor arm rigidly extends from said alarm body along said front face.

9. A pressure alarm device, according to claim 6, further comprising:

a pivot hinge;

said pivot hinge pivotally joining said sensor arm to said alarm body;

said pivot hinge enabling an extension of said sensor arm along said front face of said pressure gauge during said use; and said pivot hinge enabling a retraction of said sensor arm away from said pressure gauge prior to said use, whereby said user can easily view said pressure gauge during said use and position sensor arm and said means for sensing at said first desired position.

10. A pressure alarm device, according to claim 9, wherein:

said alarm body includes a first indicator mark along a radian extending from said pivot, whereby said first indicator mark enables simple user alignment of said alarm body with a desired position on a pressure scale of said pressure gauge; and said means for sensing on said sensor arm positioned at a selected offset angle distant from said first indicator mark, whereby when said user aligns said first indicator mark with said desired position on said pressure scale, and pivots said sensor arm to extend along said front face, said sensor means is positioned at said first desired position said selected offset angle.

11. A pressure alarm device, for a pressure gauge having an indicator needle operable about a pivot, said pressure alarm device comprising:

an alarm body;

at least a first means for sensing at least a first desired position of said needle relative to said pivot during a use of said pressure gauge and for creating a corresponding position signal;

said means for sensing and creating operably joined to said alarm body;

means for retaining said alarm body proximate said pressure gauge and for positioning said means for sensing relative to said first desired position;

alarm circuit means for receiving said position signal and for generating at least one alarm signal;

said means for receiving and generating operably joined to said alarm body; and means for supplying power to said alarm circuit means, whereby during said use when said means for sensing and creating determines said needle is at said at least first desired position and creates said corresponding position signal, said alarm circuit means receives said position signal and generates said at least one alarm signal; further comprising:

at least one alarm generating component in said alarm circuit means;

said at least one alarm component generating said at least one alarm signal;

said at least one alarm component being at least one of an audible alarm unit, a visual alarm unit, a wired electronic message alarm unit, a wireless electronic message alarm unit, and a mechanical alarm unit; and said at least one alarm signal being at least one of an audible signal, a visual signal, an electronic signal, an electronic message signal, and a mechanical signal, whereby said one at least one alarm component is effective to notify a user of said alarm signal, at least one system controller in said alarm circuit means;

said at least one system controller monitoring said alarm circuit during said use and determining a validity of said position signal based upon a predetermined acceptable position signal profile; and said system controller actuating said at least one alarm generating component, whereby said system controller prevents false alarm signals and conserves alarm circuit energy.

12. A pressure alarm device, according to claim 11, further comprising:

at least one memory device in said alarm circuit means;

said memory device retaining at least one validity parameter and said predetermined acceptable position signal profile; and said system controller comparing said position signal to said at least one validity parameter and said predetermined position signal profile during said use, whereby said system controller determines a validity of said position signal relative to both said at least one validity parameter and said acceptable position signal profile.

13. A pressure alarm device, according to claim 12, further comprising:

at least means for receiving external electronic control signals in said at least one system controller; and said electronic control signals allowing an external operator to submit control instructions to said controller during said use and to store said control instructions in said at least one memory device, whereby said system controller enables an electronic control of said pressure alarm device from a remote communications position.

14. A pressure alarm device, according to claim 13, wherein:
said means for receiving includes means for receiving said control signals via one of a wired and a wireless communication system; and
said communication system including a communication interface with at least one of the world wide web, a cellular signal system, and a cellular paging system.

15. A pressure alarm device, comprising:
a pressure alarm;
a pressure gauge;
said pressure gauge including an indicator needle operable about a pivot relative to a pressure scale upon an introduction of an external gas pressure;
said pressure alarm including at least a first means for sensing at least a first desired position of said needle during a use of said pressure alarm device and for creating a corresponding position signal;
alarm circuit means in said pressure alarm for receiving said position signal and for generating at least a one alarm signal; and
means for supplying power to said alarm circuit means, whereby during said use when said external gas pressure is applied and said means for sensing and creating determines when said needle is at said first desired position and creates said corresponding position signal, said alarm circuit means generates said at least one alarm signal, at least one alarm generating component in said alarm circuit means;
said at least one alarm component generating said at least one alarm signal;
said at least one alarm component being one of an audible alarm unit, a visual alarm unit, an electronic signal alarm unit, an electronic message alarm unit, and a mechanical alarm unit; and
said at least one alarm signal being at least one of an audible signal, a visual signal, an electronic signal, an electronic message signal, and a mechanical signal,
at least one system controller in said alarm circuit means;
said at least one system controller monitoring at least said alarm circuit means during said use and determining at least a validity of said position signal based upon a predetermined acceptable position signal profile; and
said system controller actuating said at least one alarm generating component, whereby said system controller prevents false alarm signals and conserves an alarm circuit energy.

16. A pressure alarm device, according to claim 15, further comprising:
at least one memory device in said alarm circuit means;
said memory device retaining at least one validity parameter and said predetermined acceptable position signal profile; and
said system controller comparing said position signal to said at least one validity parameter and said predetermined position signal profile during said use, whereby said system controller determines a validity of said position signal relative to both said at least one validity parameter and said acceptable position signal profile.

17. A pressure alarm system, adaptable to a pressure supply system, comprising:
a pressure stem;
said pressure stem in a pressure communication with said pressure supply system;
said pressure supply system including at least one gas cylinder;
at least a pressure diaphragm in a pressure communication with said pressure stem;
at least one male pressure release device in an operable pressure communication with said pressure stem, whereby said at least one pressure release device enables filling external items with a pressurized gas released from said gas cylinder during a use;
a pressure alarm device in a pressure communication with said pressure stem, comprising:
at least a first pressure gauge and at least a first pressure alarm;
said pressure gauge having an indicator needle operable about a pivot during said use;
at least a first means for sensing at least a first desired position of said needle during said use and for creating at least a first corresponding position signal;
alarm circuit means for receiving said position signal and for generating at least one alarm signal;
both said means for sensing and creating and said alarm circuit means in said pressure alarm; and
means for supplying power to said alarm circuit means, whereby during said use, when said means for sensing determines said needle is at said at least first desired position, said means for sensing creates said corresponding position signal and said alarm circuit means generates said at least one alarm signal.

* * * * *